United States Patent [19]

Rashev

[11] Patent Number: 4,867,878

[45] Date of Patent: Sep. 19, 1989

[54] LIQUID BEARING FOR ROTARY APPARATUS

[75] Inventor: Michael S. Rashev, New York, N.Y.

[73] Assignee: Membrex, Inc., Garfield, N.J.

[21] Appl. No.: 204,621

[22] Filed: Jun. 9, 1988

[51] Int. Cl.$^4$ ............................................. B01D 33/06
[52] U.S. Cl. .................................... 210/363; 210/365; 210/380.1; 210/927; 55/400; 366/282; 366/305; 366/306; 73/473
[58] Field of Search ....................... 366/12, 13, 64, 97, 366/98, 99, 142, 279, 281, 282, 305, 306, 314, 284; 210/359, 363, 365, 380.1, 380.3, 390, 402, 927; 55/350, 400, 467; 241/85, 89.1; 73/66, 455, 458, 460, 468, 472, 473, 483, 484; 74/826, 840; 137/247.11, 251.1, 544, 547; 604/4, 5; 422/44, 48, 99, 101

[56] References Cited

U.S. PATENT DOCUMENTS

| | | | |
|---|---|---|---|
| 1,217,207 | 2/1917 | North | 210/767 |
| 1,262,146 | 4/1918 | Ward | 210/767 |
| 2,152,900 | 4/1939 | Manning | 210/177 |
| 2,368,876 | 2/1945 | Terradas | 210/767 |
| 2,752,043 | 6/1956 | VanRiel | 210/232 |
| 3,029,951 | 4/1962 | Cannon | 210/298 |
| 3,451,550 | 6/1969 | Cox | 210/325 |
| 3,523,077 | 8/1970 | Camirand | 210/232 |
| 3,647,632 | 3/1972 | Johnson et al. | 195/142 |
| 3,812,724 | 5/1974 | Curtz et al. | 73/468 |
| 3,957,637 | 5/1976 | Morey | 210/103 |
| 4,042,503 | 8/1977 | Justus | 210/103 |
| 4,267,060 | 5/1981 | Miller | 210/741 |
| 4,302,330 | 11/1981 | Cusato, Jr. | 210/107 |
| 4,343,708 | 8/1982 | Rantanen | 210/744 |
| 4,543,825 | 10/1985 | Schönfeld et al. | 73/472 |
| 4,675,106 | 6/1987 | Schoendorfer | 210/232 |

FOREIGN PATENT DOCUMENTS

| | | |
|---|---|---|
| 0038643 | 10/1981 | European Pat. Off. . |
| 0112152 | 6/1984 | European Pat. Off. . |
| 2459587 | 10/1975 | Fed. Rep. of Germany . |
| 2558682 | 7/1977 | Fed. Rep. of Germany . |
| 1218903 | 5/1960 | France . |
| 1601097 | 9/1970 | France . |
| 85-2783 | 7/1985 | PCT Int'l Appl. . |
| 85-4112 | 9/1985 | PCT Int'l Appl. . |
| 86-1426 | 3/1986 | PCT Int'l Appl. . |
| 86-6293 | 11/1986 | PCT Int'l Appl. . |
| 88-1194 | 2/1988 | PCT Int'l Appl. . |
| 8801193 | 2/1988 | PCT Int'l Appl. . |

OTHER PUBLICATIONS

Thomas et al., "Fluid Dynamic Considerations in Airlift and Annular Vortex Bioreactors for Plant Cell Culture," *Annals N.Y. Academy of Sciences*, vol. 506, pp. 171–189 (1987).

Irizarry et al., "Adsorption and Filtration of Trace Contaminants in Aqueous Effluents," Oak Ridge Station, School of Chemical Engineering Practice, Mass. Inst. of Tech., paper ORNL-MIT-129 (1971).

Janes et al., "Demonstration of a Bubble-Free Annular-Vortex Membrane Bioreactor for Batch Culture of Red Beet Cells," *Biotechnology Techniques*, vol. 1, No. 4, pp. 257–262 (1987).

MBR Bio Reactor AG (member of Sulzer Group), "Dynamic Bio Pressure Filter BDF-2," 2-page brochure (1987).

MBR Bio Reactor AG (member of Sulzer Group), "Dynamic Bio Pressure Filter," 4-page brochure (year unknown).

(List continued on next page.)

*Primary Examiner*—Richard V. Fisher
*Assistant Examiner*—Wanda Millard
*Attorney, Agent, or Firm*—Bryan, Cave, McPheeters & McRoberts

[57] ABSTRACT

A liquid bearing for use in rotary devices processing biological fluids is disclosed. The device has a stationary housing and a rotating cartridge. One end of the cartridge is rotatably connected to the housing. The other end is not directly connected to the housing, and, thus, is free to move laterally during rotation. The liquid bearing tends to recenter the free end of the cartridge during rotation.

17 Claims, 4 Drawing Sheets

OTHER PUBLICATIONS

Kroner et al., "Recent Studies of Dynamic Filtration in Enzyme Recovery," Engineering Foundation Conference in Uppsala, Sweden (May 1986).

Kroner et al., "Experiences with a Rotational Shear Filter in the Recovery of Biological Products," MIT Workshop (Jun. 24, 1988).

van Hemert et al., "Safety Aspects of Closed-System Filtration and Ultrafiltration in Vaccine Production," *Swiss Biotech*, vol. 5, No. 2a (1987).

Hildebrandt, "Downstream Processing with Hydrophilic membranes in Rotary Filtration Systems," MIT Biotechnology Process Engineering Center Workshop on Advances in Membrane Technology for Bioprocesses (Jun. 24, 1988).

Hildebrandt et al., "The Use of Taylor Vortices in Protein Processing to Enhance Membrane Filtration Performance," Bioprocess Engineering Colloquium (American Society of Mechanical Engineers, Nov. 1987).

Membrex, Inc., "BENCHMARK Rotary Biopurification System," 6-page brochure (Apr. 1988), Garfield, Ill.

Sherwood et al., "Desalination by Reverse Osmosis," *IEC Fundamentals*, vol. 6, pp. 2–12 (1967).

Sulzer Biotechnics "Dynamic Pressure Filtration," 2-page Brochure (1985), Sulzer Brothers Limited, CH8401 Winterthurz Switzerland.

Thayer, "Spin Filter Device for Suspension Cultures," Chapter 12, in *Tissue Culture Methods and Applications*, edited by Kruse, Jr., et al., pp. 345–351 (1973).

Himmelfarb et al., "Spin Filter Culture: The Propagation of Mammalian Cells in Suspension," *Science*, vol. , pp. 555–557 (May 1969).

Tobler, "Dynamic Filtration—The Engineering Concept of the Excher Wyss Pressure Filter," *Filtration & Separation*, vol. 16, pp. 630–632 (Nov./Dec. 1979).

Afeyan et al., "Continuous Adsorptive Extraction of Proteins," Bioprocess Engineering Colloquium, Winter Meeting of ASME, pp. 101–104 (Dec. 13–18, 1987).

Fuller, *Theory and Practice of Lubrication for Engineers*, pp. 192–193 (John Wiley and Sons, Inc.).

LIQUID BEARING FOR ROTARY APPARATUS

BACKGROUND OF THE INVENTION

This invention relates to the field of rotary bearings and more specifically to the field of rotary liquid bearings for bioprocessing equipment.

Radial bearings and axial thrust bearings are known. Radial bearings allow one member to rotate with respect to another member. Axial thrust bearings allow a member to rotate and, in addition, provide an axial force (thrust), perpendicular to the direction of rotation.

Rotating biological equipment is known, and bearings are used in such equipment. See, for example, U.S. Pat. Nos. 3,647,632 (bearing 22), 4,302,330 (bearing 60), and 4,675,106 (bearing pins 29 and 42); European Published Application 0 112 152 (bearing 78 with tapered surface 79 in FIGS. 1 and 2 and bearing 104 in FIGS. 7 and 8); PCT Published Applications WO 86/01426 (bearing 44), WO 85/04112 (bearings 102 and 103), WO 86/06293 (pivot pins 29 and 42, and bearing surfaces 30, 45, and 46), WO 88/01194 (pivot pins 20 and 22 and pivot bearing 150), and WO 85/02783 (e.g., bearings 152a and b in FIG. 14); Sherwood, "Desalination by Reverse Osmosis," *I&EC Fundamentals*, Volume 6, pages 2–12 (1967); Sulzer Biotechnics, "Dynamic Pressure Filtration," two-page brochure (1985); Thayer, "Spin Filter Device For Suspension Cultures," chapter 12 in Kruse (editor), *Tissue Culture Methods And Applications*, pages 345–351 (1973); Himmelfarb, "Spin Filter Culture: The Propagation of Mammalian Cells in Suspension," *Science*, pages 555–557 (May 1969); and Tobler, "Dynamic Filtration—The Engineering Concept of the Escher Wyss Pressure Filter," *Filtration & Separation*, Volume 16, pages 630–632 (November/December 1979). Afeyan, "Continuous Adsorptive Extraction Of Proteins," *Bioprocess Engineering Colloquium*, Winter Annual Meeting of ASME, pages 101–104 (December 13–18, 1987) discuss rotary devices, including those of Membrex, the assignee of this application.

There are different bearing configurations. For example, the end of a rotating shaft may ride and rotate within a concavity in a stationary member. If the corresponding adjacent surfaces of the shaft and stationary member do not produce too much frictional heat because they are smooth and lubricious enough and/or the speed of rotation is slow enough, the surfaces may not bind. A lubricating fluid may be used between the surfaces. Mechanical bearings, such as ball bearings, are sometimes used. Such bearings also perform a centering function, that is, they laterally center the moving member during rotation so that its axis of rotation remains substantially coincident with the longitudinal axis of the housing or framework in which it was designed to rotate.

Liquid bearings, in which the corresponding adjacent rotating and stationary surfaces of the device are separated sufficiently by a liquid film, are also known. In such bearings, there is essentially only "liquid friction" and not "dry friction" or "semi-dry friction." Liquid bearings that center the rotating member are known but apparently have not been used in rotating equipment processing biological fluids. (See Fuller, *Theory and Practice of Lubrication for Engineers*, page 192 et seq., particularly FIG. 124 (John Wiley & Sons, Inc. 1956), which book is hereby incorporated in its entirety.) That may be because of concerns about contaminating the biological substances with a bearing fluid.

Figure 1:
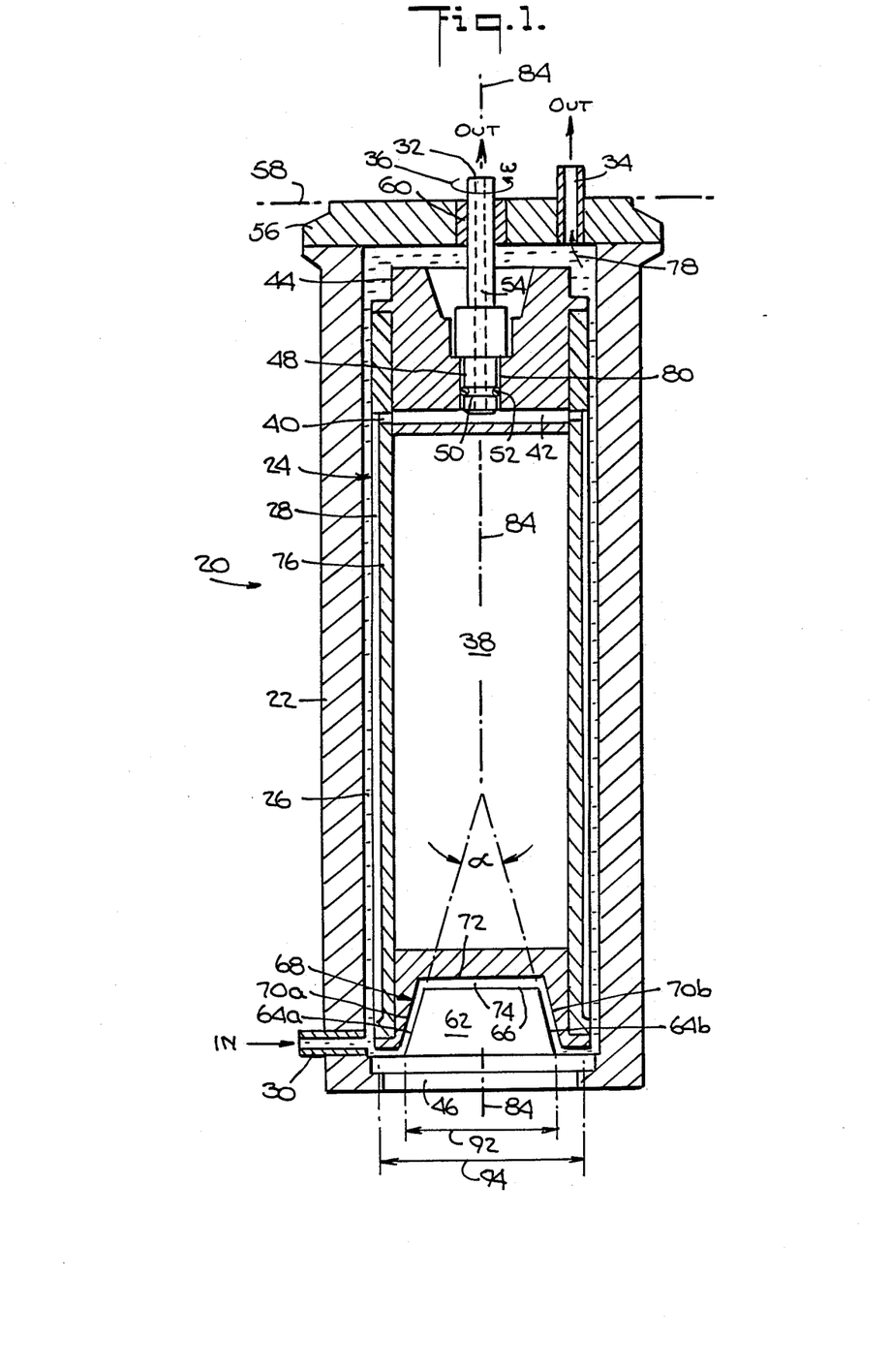
FIG. 1 is a sectional elevational view of a rotary filter device having a liquid bearing in accordance with this invention.
Figures 2, 3:
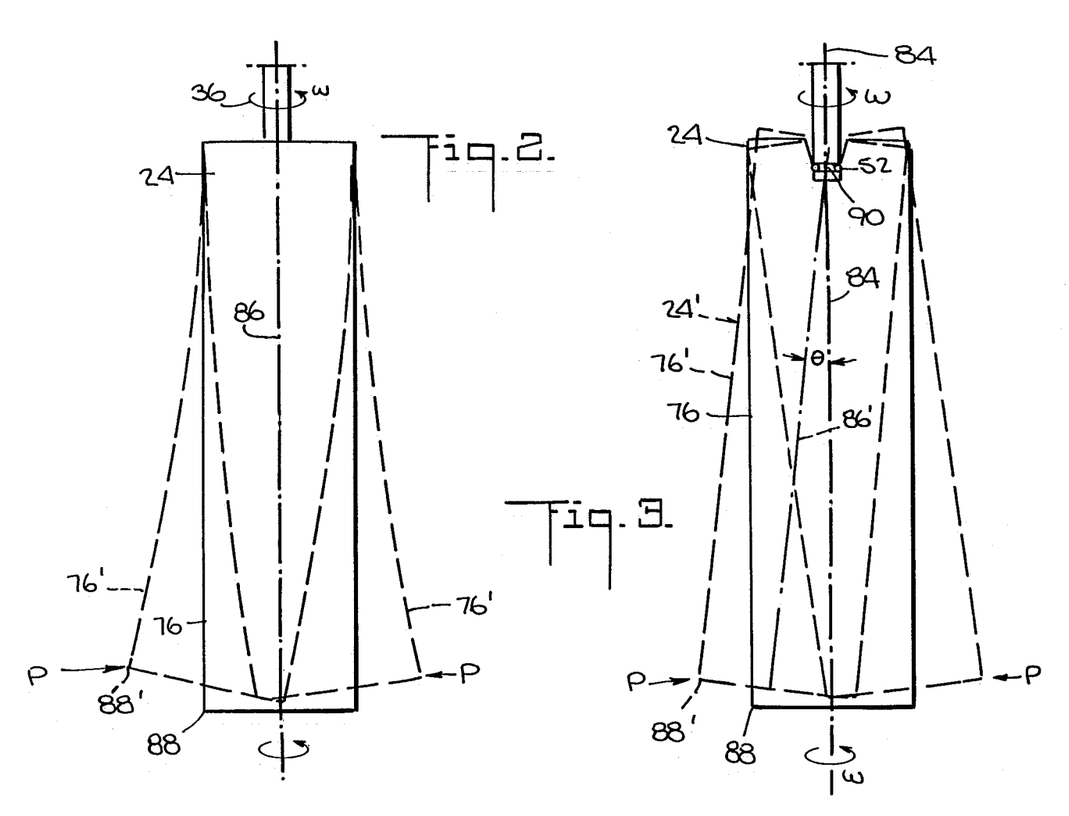
FIGS. 2 and 3 are schematics showing the cartridge "wobbling" (i.e., being laterally displaced) during rotation.
Figure 7:
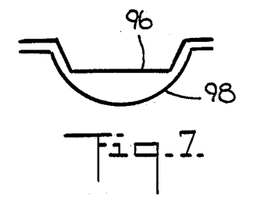
Figure 8:
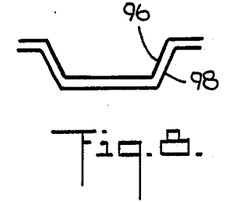
Figure 9:
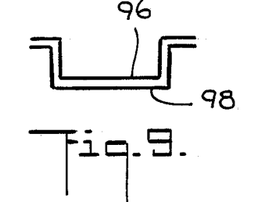

In FIGS. 1 and 2 of EPO 0 112 152, shoulder 80 of rotating filter 14 is urged downward against tapered surface 79 of bearing 78. That keeps filter 14 centered and creates a fluid-tight seal between the filtrate (plasma) in passageway 58 and remaining unfiltered blood (retentate) in concavity 84. In FIGS. 7 and 8, end bearing 104 projects up into manifold 94 and O-ring 102 provides the required fluid-tight seal and keeps rotating filter 14 centered.

In FIG. 1 of U.S. Pat. No. 3,647,632 lower shaft 21 rides on foot bearing 22. In PCT published application WO 85/02783 the rotating filters are mounted for rotation as by bearings 152 in FIG. 14. Those bearings also keep the filter centered. In FIGS. 17 and 18 of the same application, the bottom bearings comprise extensions of the bottoms of the rotating filters, which extensions ride within mating concavities in the bottom housing members 168.

However, in none of these devices is a liquid bearing used to keep the rotating member laterally centered. In none of these devices is a liquid bearing used to keep a rotating member laterally centered where the rotating member is free to become off-center during rotation. In none of these devices is a liquid bearing used to keep the free end of a rotating member laterally centered and also provide axial thrust during rotation. In none of these devices is a liquid bearing used as the only way to substantially reduce the shear forces on biological substances in fluids as they contact or otherwise pass through a bearing.

SUMMARY OF THE INVENTION

The present invention satisfies the need for such a bearing in rotating biological systems. Broadly, the combination of this invention comprises:
(a) a biological fluid; and
(b) a rotary device having
   (i) an outer stationary housing with a cavity, the cavity having a longitudinal axis;
   (ii) an inner cartridge having first and second ends and having a longitudinal axis of rotation passing through both ends, the cartridge being mounted for rotation within the housing so that the longitudinal axis of the housing and the axis of rotation of the cartridge are substantially co-linear, the first end of the cartridge being free of any direct attachment to the housing and having a tendency during rotation to be laterally displaced from the longitudinal axis of the housing;
   (iii) a liquid bearing formed by (A) a rotating bearing surface at the first end of the cartridge substantially symmetrically located about the cartridge's axis of rotation, (B) a corresponding stationary bearing surface attached to the housing, substantially symmetrically located about the housing's longitudinal axis, and closely spaced from the rotating bearing surface, and (C) biological fluid between the two bearing surfaces; the two bearing surfaces being spaced far enough apart so that during rotation the liquid bearing provides hydrodynamic forces that tend to recenter the first end of the cartridge.

The invention avoids the need for having a mechanical bearing (e.g., ball bearings), with its attendant wear, near at least one end of the device. Use of a liquid bearing prevents excessive heat build-up, which could damage biological fluids. Because there are no solid surfaces rubbing against each other in the liquid bearing, mechanical compaction/abrasion, which could injure cells and other components of biological fluids, is avoided. In the combination of this invention the biological fluid itself serves as the working fluid for the liquid bearing, so a foreign (and contaminating) bearing fluid is unnecessary. Other advantages of the invention will be apparent to those skilled in the art.

BRIEF DESCRIPTION OF THE DRAWINGS

To facilitate further description of the invention, the following drawings are provided in which.

These drawings are provided for illustrative purposes only and should not be construed to limit the scope of the invention.

DETAILED DESCRIPTION OF THE INVENTION

As used herein, the term "biological fluid" includes a fluid directly or indirectly derived from biological organisms or living processes, for example, blood, fermentation liquids of cells in nutrient broths, fermentation products, and spinal fluids. "Biological fluids" may but need not contain cells or proteins.

The "rotary devices" of the combinations of this invention may be rotary filters, e.g., filters having membranes on the outer surface of the rotating member or on the inner surface of the stationary member, or infusion/mixing devices, e.g., devices where a substance fed to the device is mixed with biological fluid passing through the device. The rotating member may have the shape of a cone, a cylinder, or a frustum of a cone. Other shapes may be used. The corresponding inner surface of the stationary member may but need not have the same shape as the outer surface of the cylinder.

Fluid feed to and withdrawal from the device may be batch, continuous, or semi-continuous. The fluid may enter and/or exit through openings in the bottom, top, or side of the housing. In batch operation, fluid may be fed to or recovered from the device after rotation has stopped.

The device may have a gap formed by the outer wall of the cartridge (rotating member) and the inner wall of the housing. In that case, Taylor vortices may be present in the biological fluid in the gap during rotation if the Taylor number is greater than about 40 (see published PCT application WO 85/02783 of Membrex, the contents of which application are hereby incorporated in their entirety).

In the combination of this invention, the cartridge is not directly or indirectly attached to the housing at one end and the two bearing surfaces of the liquid bearing are not directly or indirectly attached to one another. Only a layer of biological fluid separates the opposing bearing surfaces. This fluid layer is not considered to make the cartridge directly or indirectly attached to the housing or to make the rotating and stationary bearing surfaces attached to one another. The unattached end of the cartridge is free to move laterally ("wobble") during rotation. Such lateral movement is obviously undesirable, particularly if rotation is at high speed.

Rotational wobble may be caused by a number of factors, such as a slight imbalance in the weight distribution of the cartridge or the longitudinal flexibility of the cartridge. Such imbalance is more likely to occur with cartridges made of plastic as opposed to cartridges of metal because, for example, cartridge wall thickness will be less uniform if the cartridge is of plastic than if it is of metal. Rotational wobble may also be caused by the flexibility, particularly longitudinal flexibility, of the cartridge. Plastic that would be used for the cartridge is more flexible than, for example, stainless steel of the same thickness. However, plastic may be more desirable to use than metal because of greater ease of manufacture and lower cost. Lower cost may be particularly important if the cartridge is to be disposable.

The cartridge may be rotatably attached to the housing at one end. Usually the device will be oriented vertically, the rotatable mount (connection), if present, will be at the top end of the cartridge, and the bottom end will not be attached to the housing. The cartridge may instead be rotatably connected to the bottom of the housing and the free end of the cartridge may be the top. The device need not be oriented vertically; horizontal or other orientations are also possible.

The liquid bearing of this invention comprises two opposed bearing surfaces, one on the cartridge and one on the housing. The surfaces may both be non-planar (e.g., convex and concave) or one may be planar and the other non-planar. Desirably the two bearing surfaces will have non-planar conforming shapes. For example, the bottom of a vertically oriented rotatable cylindrical cartridge may have a conical concavity with the "cone" pointing up and the stationary bottom of the housing may have a mating conical convexity that fits within the concavity and is pointing up. The convex conical portion must be smaller than the mating concavity so that there is enough space for sufficient biological fluid to enter between the two surfaces to provide only liquid friction.

The bearing surface of the cartridge is symmetrical about the longitudinal axis of rotation of the cartridge. The bearing surface of the housing is symmetrical about the longitudinal axis of the housing. Ideally, during rotation the two axes will remain co-linear, that is, they will lie on the same line and the cartridge's axis of rotation will not move away from that line.

However, in the real world, the imperfect weight distribution of the cartridge and any membrane on it, the elastic nature of the cartridge (no cartridge, even one of metal, is perfectly rigid), etc. will cause the free end of the cartridge to move laterally when the cartridge is rotated. Thus, during rotation the axis of rotation will move away from the longitudinal axis of the housing. Such lateral displacement will generally be greater at the end of the cartridge farthest from the point at which the cartridge is attached to its driving shaft. It is a feature of this invention that the two bearing surfaces in combination with the biological fluid between them during rotation and as a result of rotation tend to recenter the free (unattached) end of the cartridge, thereby moving the longitudinal axis of rotation of the cartridge back towards the longitudinal axis of the housing.

Although the ability of liquid bearings to recenter rotating members and the hydrodynamic forces involved are known (e.g., Fuller, *Theory and Practice of Lubrication for Engineers*, e.g., FIG. 124), such bearings have apparently not been used with biological fluids. That they can be so used is unexpected in view of teachings such as in EPO 0 112 152, pages 16–17, where the device is designed to keep the biological fluid away from the bearing.

The two corresponding stationary and rotating bearing surfaces at the free end of the device may have essentially any shape so long as they perform the desired functions, including causing sufficient hydrodynamic forces to laterally recenter the free end of the device. A preferred configuration is shown in FIG. 1 in which the longitudinal cross-sectional shapes correspond to one another and are frusto-conical.

The angle of convexity alpha (either of the rotating bearing surface or of the stationary bearing surface) will be from 0°–180°, usually from 5°–90°, preferably from 10°–60°, more preferably from 15°–45°, and most preferably from 20°–40°. In the embodiment shown in FIG. 1, an angle alpha of about 30° is preferred. The "angle of convexity" for the stationary bearing surface is the angle between the two sides of the convexity of that bearing surface as measured in a plane in which the longitudinal axis of the housing lies. The "angle of convexity" for the rotating bearing surface is the angle between the two sides of the convexity of that bearing surface as measured in a plane in which the longitudinal axis of rotation of the cartridge lies. For a convex bearing surface that has the shape of a right cylinder, the "angle of convexity" is zero because the two sides of that cylinder in longitudinal cross-section are parallel, i.e., they do not intersect.

The clearance (distance) between the two bearing surfaces must be large enough so that during rotation there is substantially only liquid friction between them. The distance required in a particular device will depend on a variety of factors, including the properties of the biological fluid such as viscosity, the size and shape of the two bearing surfaces, and the speed of rotation. The clearance will usually be between 0.3 and 0.8 millimeters, although smaller and greater clearances may be used. In a device having substantially the configuration shown in FIG. 1 in which the cartridge is 4.5 centimeters in diameter and 16.0 centimeters in height and the angle of the convexity of each of the two lower bearing surfaces is 30°, the longitudinal axial distance between the two bearing surfaces is about 1.6 millimeters and the clearance between the two angled bearing surfaces is about 0.5 millimeters.

Turning now to the drawings, in FIG. 1 device 20 comprises cartridge 24 having longitudinal axis of rotation 86 (FIG. 2) rotating inside housing 22 having longitudinal axis 84. The direction of rotation is indicated by arrow 36 and rotational velocity is indicated by omega. Feed liquid enters the device through fluid inlet 30 and flows into the space between the cartridge and the housing, which space includes filtration gap 26. Some of the fluid in the gap flows through filtration membrane 28, through collection grooves (not shown) on the outer surface of cartridge side wall 76, through ports 40 in side wall 76 into plenum 42, and through longitudinal passageway 54 in drive shaft 32 out of the device. Retentate (feed liquid that does not pass through the membrane) leaves the void space between the housing and the rotating cartridge through outlet nozzle 34 as shown by arrow 78. In the embodiment shown in FIG. 1, internal cavity 38 is closed and does not contain fluid.

Cartridge 24 has top plug 44 and housing 22 has bottom plug 46, the top part of which is convexity 62. That convexity has a frusto-conical shape with side surface 64 and top surface 66. Because FIG. 1 is a longitudinal cross-section of the device with longitudinal housing axis 84 lying in the plane of the cross-section, frusto-conical convexity 62 appears as a trapezoid in FIG. 1. The opposing slanted (angled) sides 64a and 64b of that trapezoid form an angle alpha of about 30 degrees.

Cartridge 24 has matching frusto-conical concavity 68, which has top side 72 and side wall 70. In the cross-section of FIG. 1, the three-dimensional curved side wall 70 has straight side walls 70a and 70b.

During rotation of the cartridge, liquid 74 between convexity 62 and concavity 68 in combination with their matching surfaces (surfaces 64 and 66 of the convexity and surfaces 70 and 72 of the concavity) produce the hydrodynamic forces required to recenter the bottom of the cartridge and thereby bring the axis of rotation of the cartridge back into realignment with the axis of the housing. Those forces may be thought of as acting in the following manner.

If the bottom of the cartridge moves to the left as viewed in FIG. 1, surfaces 64b and 70b move closer together and surfaces 64a and 70a move farther apart. Because the cartridge is spinning, liquid is carried away from the widened gap between surfaces 64a and 70a and forced into the narrowed space between surfaces 64b and 70b. That decreases the pressure in the gap between 64a and 70a and increases the pressure between 64b and 70b. That in turn tends to push the bottom of the cartridge to the right. Thus, any perturbation of the bottom of the cartridge results in forces that oppose the perturbation and tend to recenter the bottom of the cartridge. Recentering the bottom of the cartridge results in bringing the longitudinal axis of rotation of the cartridge back into alignment with the longitudinal axis of the housing.

The cartridge is rotated by drive means (not shown) located above section line 58 in top 56 of the housing. Rotational force is transmitted by means of drive shaft 32, which passes through bearing/seal 60, and drive shaft extension 48. Drive shaft extension 48 is friction-fit inside matching concavity 80 in top plug 44 of the cartridge. O-ring 52, which fits within circular groove 50 in extension 48, provides a fluid-tight seal between filtrate in plenum 42 and retentate in the void space. As a result of rotation and of the bearing surface 70 in the bottom of the cartridge being slanted, a vertical upwards force against surface 70 also develops and pushes the cartridge up, thereby insuring a fluid-tight seal.

Cartridge 24 has outer diameter 94 and cartridge concavity 68 has outer diameter 92. Concavity diameter 92 will usually be at least 30% of cartridge diameter 94, more usually at least 40%, preferably at least 60%, and most preferably at least 70%. In the working unit discussed above, the ratio is about 80%. In one preferred embodiment, the rotating bearing surface at the bottom of the cartridge is a convexity whose angle of convexity is zero and whose diameter is the same as that of the cartridge. In another preferred embodiment the rotating bottom bearing surface is a frusto-conical convexity whose largest outer diameter is the same as that of the cartridge.

FIG. 2 shows in schematic (and to an exaggerated degree) flexing of the cartridge side wall 76. Because of the real-world lack of perfect rigidity, the imperfection in the weight distribution around the axis of rotation, etc., side wall 76 flexes or bends sufficiently to move cartridge bottom 88 to the position shown in phantom line. Arrows "P" indicate the hydrodynamic pressure that tends to recenter the bottom of the cartridge whether the bottom moves to the left or the right.

FIG. 3 shows in schematic (and to an exaggerated degree) a cartridge whose free end "wobbles" during rotation for a reason other than lack of rigidity of the cartridge; in this drawing, sidewall 76 is shown as being perfectly rigid. Because of the method of securing the cartridge to the drive shaft at O-ring 52, the point of rotation of the cartridge about the drive shaft is at point 90, in the middle of the O-ring. The angle of displacement or wobble between longitudinal axis of rotation 86' and longitudinal housing axis 84 is angle theta. Arrows P represent the hydrodynamic forces that tend to recenter the bottom of the cartridge during rotation so as to make those two axes co-linear.

FIGS. 4 to 13 show a variety of pairs of bearing surfaces 96 and 98. For the sake of simplicity, all pairs may be assumed to be at the bottom of a vertically oriented rotary device. In that case, surface 96 rotates and is at the bottom of the rotating member and surface 98 is stationary and is connected to the housing. However, the pairs could be at the top of the device, in which case surface 96 would be stationary and attached to the housing and surface 98 would rotate and be attached to the rotating member.

Figure 4:
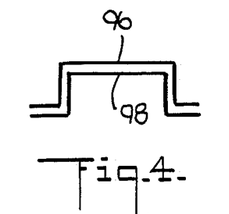
FIGS. 4 to 13 are detail views showing various pairs of rotating and stationary bearing surfaces.
Figure 5:
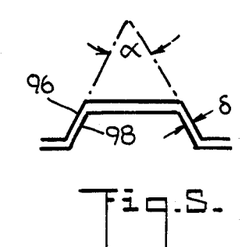

In FIG. 4, rotation will cause only centering forces, not vertical forces, because the sides of the bearing surfaces are not slanted. In FIG. 5, the angle of convexity of both surfaces is about 60 degrees, and rotation will cause vertical forces in addition to centering forces. The magnitude of clearance delta between the corresponding sides of the bearing elements 96 and 98 has a direct effect on the magnitude of the recentering force. One skilled in the engineering art will know how to compute the required clearance.

Figure 6:
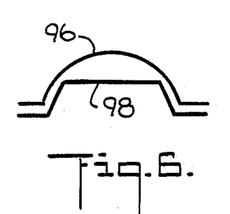
Figure 10:
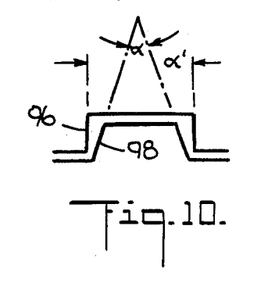
Figure 11:
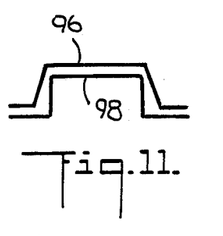
Figure 12:
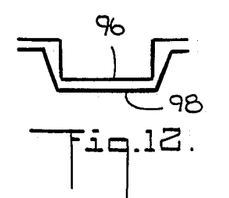
Figure 13:
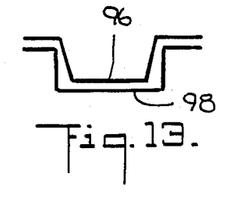

In FIG. 6, surface 96 is hemispherical. In FIG. 10, surface 98 has an angle of convexity alpha of about 30 degrees and surface 96 has an angle of convexity alpha' of zero degrees.

Figure 14:
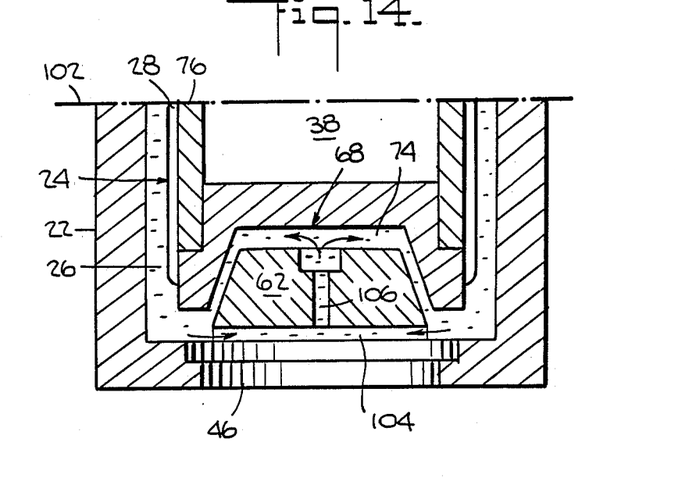
FIG. 14 is a detail view of the bottom of a device with a stationary bearing having an internal passageway for the circulation of biological fluid.

FIG. 14 shows a bottom cross-section of a rotary device below section line 102. Bottom plug 46 has horizontal radial passageway 104, which connects to vertical and preferably axial passageway 106. The top opening of passageway 106 terminates in the horizontal space between the two bearing surfaces. As shown by the arrows, this system of passageways allow fluid to circulate during rotation. The passageways, if used, need not have any particular size or orientation.

Figure 15:
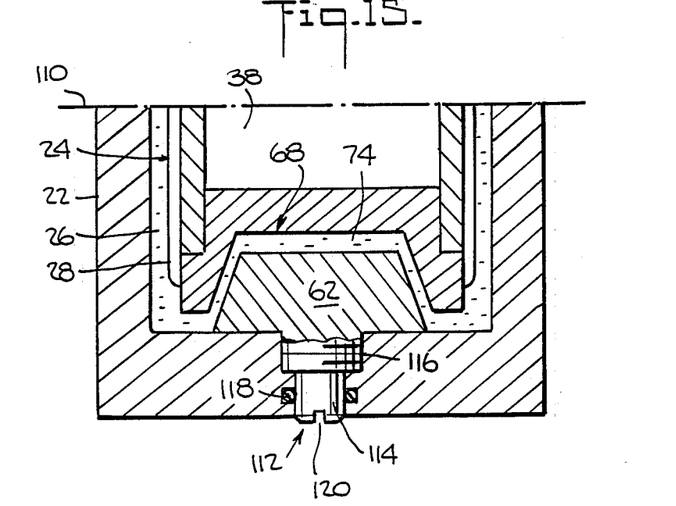
FIG. 15 is a detail view of a device having a longitudinally movable bottom, whereby the distance between the stationary and rotating bearing surfaces can be adjusted.

FIG. 15 shows a bottom cross-section of a rotary device below section line 110. This device has a stationary bearing surface that may be moved vertically (i.e., axially) to adjust the width of the gap between the two bearing surfaces. Adjustable bottom plug 112 comprises threaded portion 116, whose threads mesh with corresponding threads in the housing, and cylindrical portion 112, whose lower end has slot 120 to facilitate turning plug 112 with a screwdriver. O-ring seal 118 helps prevent the escape of fluid around the plug. Bottom stationary bearing plug or convexity 62 is moved upwards to reduce the gap for fluid 74 by clockwise rotation of plug 112, whose upper end is connected to the bottom of plug 62. Plug 62 may be lowered by turning plug 112 in the opposite direction.

Variations and modifications will be apparent to those skilled in the art, and the claims are intended to cover all variations and modifications that fall within the true spirit and scope of the invention.

I claim:
1. In combination:
   (a) a rotary device having
      (i) an outer stationary housing defining a cavity, the cavity having a longitudinal axis;
      (ii) an inner cartridge having first and second ends and having a longitudinal axis of rotation passing through both ends, the cartridge being mounted for rotation within the housing so that the longitudinal axis of the housing and the axis of rotation of the cartridge are substantially co-linear, the first end of the cartridge being free of any direct attachment to the housing and having a tendency during rotation to be laterally displaced from the longitudinal axis of the housing;
      (iii) a liquid bearing zone defined by (A) a rotating bearing surface at the first end of the cartridge substantially symmetrically located about the cartridge's axis of rotation and (B) a corresponding stationary bearing surface attached to the housing, substantially symmetrically located about the housing's longitudinal axis, and closely spaced from the rotating bearing surface; and
   (b) biological fluid located between the two bearing surfaces; the bearing surfaces being spaced far enough apart so that during rotation a liquid bearing is created in the liquid bearing zone by the biological fluid and the bearing surfaces to provide hydrodynamic forces that tend to recenter the first end of the cartridge.

2. The combination of claim 1 wherein the rotating bearing surface is a concavity.

3. The combination of claim 2 wherein the stationary bearing surface is a convexity.

4. The combination of claim 2 wherein the concavity has a side surface and the side surface is at an angle greater than zero with respect to the axis of rotation.

5. The combination of claim 4 wherein the concavity has a shape selected from the group consisting of conical, frusto-conical, and hemispherical.

6. The combination of claim 1 wherein the liquid bearing zone is at the bottom of the rotary device.

7. The combination of claim 1 wherein the rotating bearing surface is a convexity.

8. The combination of claim 7 wherein the stationary bearing surface is a concavity.

9. The combination of claim 7 wherein the convexity has a side surface and the side surface is at an angle greater than zero with respect to the axis of rotation.

10. The combination of claim 9 wherein the convexity has a shape selected from the group consisting of conical, frusto-conical, and hemispherical.

11. The combination of claim 1 wherein the rotary device is a rotary membrane filter and the housing has an inner wall, the cartridge has an outer wall opposite the inner wall of the housing to define a gap therebetween, and a membrane is mounted on the outer wall of the cartridge or on the inner wall of the housing facing the gap.

12. The combination of claim 11 wherein the biological fluid is present in the gap and the cartridge can be rotated to produce a calculated Taylor number for the fluid in the gap greater than about 40.

13. The combination of claim 1 further comprising means to circulate the biological fluid between the two bearing surfaces.

14. The combination of claim 13 wherein the means to circulate the biological fluid comprises at least one passageway for the fluid having at least one terminal opening in the stationary bearing surface.

15. The combination of claim 1 wherein the stationary bearing surface may be moved longitudinally to vary the spacing between the two bearing surfaces.

16. The combination of claim 1 wherein the rotating bearing surface has a cylindrical shape.

17. The combination of claim 1 wherein at least part of the rotating bearing surface has the same diameter as the cartridge.

* * * * *